United States Patent Office 3,195,089
Patented July 13, 1965

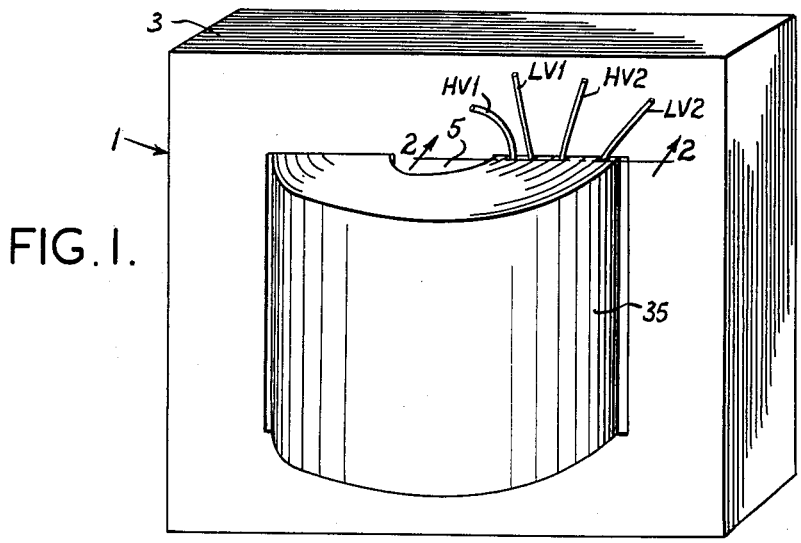
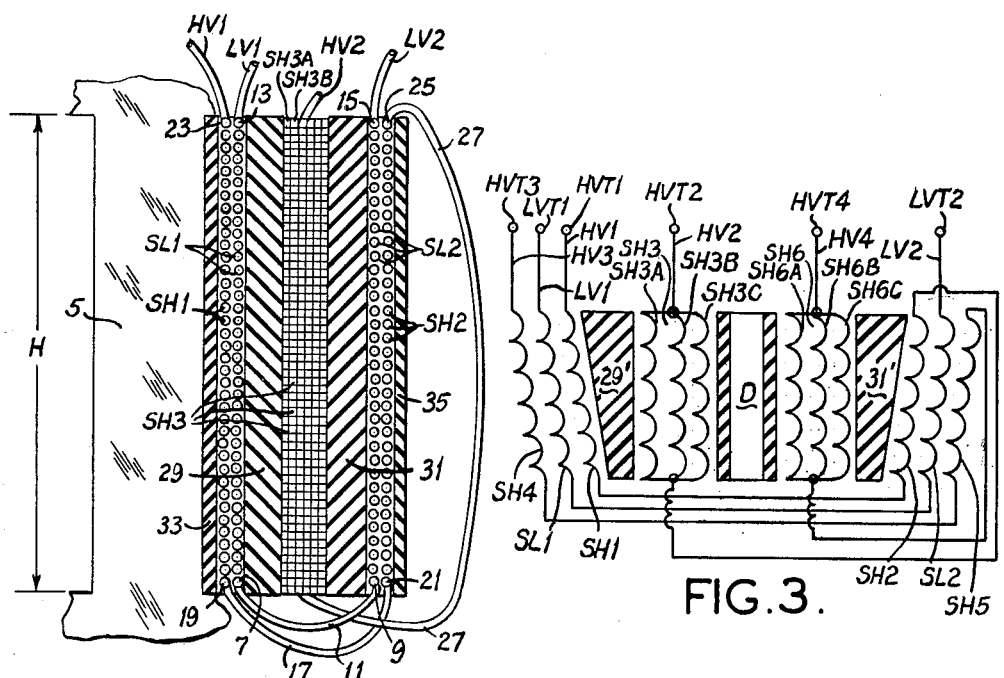

3,195,089
HIGH VOLTAGE TRANSFORMER WITH ENHANCED HIGH FREQUENCY BAND-PASS CHARACTERISTICS
Carl J. Sievers, St. Louis, Mo., and Donald H. Houston, Herrin, Ill., assignors to Moloney Electric Company, St. Louis, Mo.
Filed Aug. 22, 1962, Ser. No. 218,617
13 Claims. (Cl. 336—183)

This invention relates to electrical induction apparatus, and more particularly to a winding structure for transformers.

Among the several objects of this invention may be noted the provision of a winding structure for transformers having enhanced high frequency band-pass characteristics; the provision of such a winding structure capable of passing square waves and sharp peaked pulses without substantial distortion; the provision of such a winding structure which minimizes leakage inductance and distributed capacitance; the provision of a winding structure wherein the leakage inductance and distributed capacitance parameters may be controlled and wherein the product of these parameters may be held substantially constant; the provision of a winding structure which allows during design critical adjustment of the transformer height; the provision of a transformer winding structure in which insulation and cooling problems are minimized; and the provision of such winding structures which are adapted for mono- and multifilar use. Other objects and features will be in part apparent and in part pointed out hereinafter.

Briefly, in accordance with the invention, a winding structure for a transformer is provided. This winding structure includes a primary or low voltage winding with first and second winding sections and a secondary winding with three winding sections. Each primary winding section comprises a coil of electrical conductor of a first cross-sectional area wound coaxially about a leg of the transformer core. These low voltage coils are connected across the low voltage terminals of the transformer. The first and second winding sections of the secondary or high voltage winding each comprises a coil of electrical conductor wound coaxially about this core leg, which has a cross-sectional area not greater than that of the electrical conductors of the primary winding section coils. Each of these first and second secondary winding sections is positioned contiguous a respective one of the primary winding section coils. Each of the primary and first and second secondary winding section coils has an equal number of turns and is of substantially equal length. The winding structure of this invention further includes a third secondary winding section comprising at least two coils of electrical conductor which has a cross-sectional area not greater than said first cross-sectional area. Each of these third secondary winding coils is of a length substantially equal to that of the primary and other secondary winding section coils and the coils thereof are parallel-connected one with the others and positioned side-by-side relative thereto. The third secondary winding section is positioned coaxially with the other coils about the core leg and is connected in series with the first and second secondary winding section coils across a second or high voltage pair of terminals of the transformer. The invention accordingly comprises the constructions hereinafter described, the scope of the invention being indicated in the following claims.

In the accompanying drawings in which one of various possible embodiments of the invention is illustrated, FIG. 1 illustrates an exemplary winding structure according to the present invention employed in a shell type transformer;

FIG. 2 is a cross section of this winding structure taken along line 2—2 of FIG. 1; and FIG. 3 illustrates schematically a modified embodiment of the present invention.

Corresponding reference characters indicate corresponding parts throughout the drawings.

Referring now to the drawings, and more particularly to FIGS. 1 and 2, a winding structure according to the present invention is illustrated as being employed as the winding of a shell type transformer indicated generally by reference numeral 1. This transformer has a laminated core 3 with a center leg portion 5. Inasmuch as any of many different methods of forming the butt joints between leg and yoke laminations at the T-joints between the upper and lower yokes and the center leg may be used and are familiar to those skilled in this art, no specific T-joint structures are shown. Also, it will be understood that wound type cores or ferrite type cores, as well as the stacked type specifically illustrated, may be employed in the practice of this invention. Concentrically wound about center leg portion 5 are a pair of primary or low voltage winding sections SL1 and SL2. Each of these winding sections is constituted by a helically or progressively wound coil of an electrical conductor (with an insulating coating such as enamel or the like) having a cross-sectional area sufficient to carry the rated primary current. Each of the coils is unidirectionally wound along the core leg in the sense that the winding pattern for a given coil progresses from one end of the leg to the other and does not return upon itself. The radius of coil SL1 is less than that of coil SL2. Preferably coil SL2 is wound from the same supply of electrical conductor leaving enough slack between end turn 7 at the lower end of coil SL1 and end turn 9 at the lower end of coil SL2 so as to form a cross connecting loop 11. End turns 13 and 15 at the upper ends of coils SL1 and SL2 respectively have extending outwardly therefrom low voltage leads LV1 and LV2 adapted to be connected to the customary low voltage or primary transformer terminals (not shown), usually constituted by insulated bushings. Thus, the two low voltage or primary winding section coils SL1 and SL2 having substantially the same number of turns and of substantially equal length are series-connected across the low voltage terminals. It will be understood that a separate conductor may be used to interconnect the lower turns 7 and 9 of coils SL1 and SL2 instead of the continuous conductor loop 11, or that the end turns of SL1 and SL2 may be brought out with individual leads to separate terminals for external interconnection. It is to be further noted that SL1 and SL2 may be parallel-connected across the low voltage terminals.

Also concentrically wound about the center leg portion 5 of core 3 are a pair of secondary or high voltage winding section coils SH1 and SH2. These coils are coaxial with primary winding section coils SL1 and SL2, with coil SH1 being positioned contiguous coil SL1 in a side-by-side relationship, and coil SH2 similarly positioned relative to coil SL2. Windings SH1 and SH2 are each constituted by a helically or progressively wound enamel-coated electrical conductor which, in the specific embodiment illustrated, has a cross-sectional area equal or substantially equal to that of the conductors used in forming the low voltage winding sections. Again, as with the coils SL1 and SL2, each of the individual coils SH1 and SH2 is unidirectionally wound in the sense that the winding pattern for an individual or given coil progresses from one end of the leg to the other and does not return on itself. Preferably coils SH1 and SH2 are wound from a continuous length of electrical conductor with an interconnecting loop 17 formed between end turns 19 and 21 of SH1 and SH2 respectively. End turn 23 at the top of coil SH1 is extended outwardly for connection to one of the customary pair of secondary or high voltage terminals (not shown). It will be understood, as stated above in regard to the low voltage coils SL1 and SL2 that individual lengths of conductors may be used for forming coils SH1 and SH2 and the end turns 19 and 21 may be interconnected with a separate conductive segment to form an interconnecting loop 17. It will also be noted that the contiguous pair of coils SL1 and SH1 may be interwound and thus be of the same diameter and that coils SH2 and SL2 may be similarly interwound, if desired. Further it will be understood that the relative positions of SL1 and SH1 may be reversed so the latter is outside rather than inside the former, and the same position reversal is applicable to contiguous coils SL2, SH2. Moreover, while each of SL1, SL2, SH1 and SH2 is illustrated as being constituted by a coil of electrical conductor having a circular cross section, an electrical conductor having a square or rectangular cross section may be employed. Furthermore, it will be understood that stranded conductor or several parallel-wound strands of smaller conductor elements can be used to wind coils LV1, LV2, SH1 and SH2 instead of using a single solid conductor. Also, since the rated current of the high voltage or secondary winding of the transformer is less than the rated primary current, the conductor which constitutes coils SH1 and SH2 may in some instances have a cross-sectional area which is less than the conductor which constitutes coils SL1 and SL2. It is preferred, however, particularly if these coils are positioned in side-by-side relationship as illustrated that the respective cross sections of the conductors which comprise the coils have equal or nearly equal vertical dimensions (as viewed in FIG. 2), i.e., that the conductors employed in winding coils SH1 and SH2 have a dimension in the direction parallel to the central axis of the coils substantially equal to the corresponding dimension of the conductors employed in forming coils LV1 and LV2. In any event, coils SH1 and SH2 and coils SL1 and SL2 have the same number of turns, and therefore, since each of these windings or coils progresses in one direction only and does not return on itself, there is no potential difference between adjacent turns of SL1 and SH1 on the one hand and SL2 and SH2 on the other. The small amount of insulation required to insure electrical isolation between primary and secondary windings is provided by the thin insulating coating of enamel or the like on the electrical conductor constituting the coils SL1, SL2, SH1 and SH2.

The end turn at the top of coil SH2, as indicated at 25, is extended as indicated at 27 for connection to one end of a third secondary winding section SH3 positioned between coils SL1 and SL2. This third winding section is constituted by a plurality of progressively and unidirectionally wound parallel-connected coils SH3A, SH3B, etc., of insulated electrical conductor which have a cross-sectional area not greater, and preferably considerably less, than that of the conductors of coils SH1 and SH2. Winding section SH3 is coaxial with the other winding sections but insulated therefrom by insulating layers 29 and 31. Each of the end turns at the top of coils SH3A, SH3B, etc. is commonly connected to a lead HV2 adapted to be connected to the other high voltage or secondary terminal (not shown). Each of the bottom turns of SH3A, SH3B is commonly connected to lead 27. Thus, the coils SH1, SH2 and those constituting winding section SH3 are connected in series across the secondary winding terminals. Coil SH1 is insulated from the center leg 5 of core 3 by an insulating layer 33, while an insulating layer 35 provides external insulation around the outer periphery of the winding structure.

The total number of turns which comprise the two low voltage sections SL1 and SL2 is determined by the desired ampere turns parameter for the transformer. There is, as pointed out above, a 1:1 turns ratio between SL1, SL2 and SH1, SH2, and accordingly no voltage step-up is obtained in these two pairs of winding sections. The additional high voltage winding section SH3 is provided to achieve the desired voltage step-up in the high voltage section. Thus, assuming for example that the transformer is to transform an A.C. signal of 10 kv. to a 90 kv. level, the turns ratio of the transformer will have to be 1:9. In order to provide the necessary turns ratio of 1:9 and thus produce a 90 kv. potential across high voltage leads HV1 and HV2, the additional high voltage winding section SH3 must have eight times the number of turns of coils SH1 and SH2 combined. This is accomplished according to the present invention by making the SH3A coil of SH3 the same height H as the coils SH1 and SH2 but using an electrical conductor having a cross-sectional area considerably less than that of the SH1 and SH2 windings. In the example assumed, since coil SH3A must have eight times the number of turns in one-half the distance, the diameter of the conductor used in forming coil SH3A should be $\frac{1}{16}$ that of the conductor used in forming coils SH1 and SH2. Inasmuch as the total number of ampere turns in high voltage winding sections SH1, SH2 and SH3 must equal the number of ampere turns in the low voltage winding sections SL1 and SL2, the relatively thin conductor used for coil SH3A is likely to have insufficient current carrying capacity. Additional current carrying capacity is provided by winding additional layers or coils of the same relatively thin conductor size around coil SH3A, connecting them in parallel with each other and with this coil. These additional winding layers or coils are illustrated at SH3B, SH3C, etc. Enough of these additional coils are included to provide an effective current path or total conductor cross section sufficient to carry the rated secondary current.

The potential difference between leads LV1 or HV1 (i.e., the top of the winding sections SL1 or SH1) and leads HV2 determines the thickness of insulating layer 29. In the example assumed, this potential difference is 90 kv. Similarly, the thickness of insulating layer 31 is determined by the potential difference between lead LV2 and lead HV2; this difference, in the example assumed above, being 80 kv. (90 kv. minus 10 kv.). There is no potential difference between the bottoms of coils SL1–SH1 and SL2–SH2; and the potential difference between the bottoms of these coils and the bottom of coil SH3 is only 5 kv.

Because of the cross coupling between the primary windings and the secondary windings, particularly between contiguous coil pairs SL1, SH1 and SL2, SH2, the leakage inductance $L_L$ and distributive capacitance $C_D$ parameters of the transformer are minimized. This is an important consideration in any event and particularly in the design of pulse transformers which require good high-frequency band-pass characteristics to pass square waves and peaked pulses substantially without distortion. Moreover, because of the shielding effect of the two outer pairs of coils, stray capacitance is also minimized and is in effect negligible.

The main portion of the high voltage winding, winding section SH3, can be designed to be of practically any height. To acquire the desired number of turns in this portion it is only necessary to select the desired winding height H and divide this by the chosen number of turns; the resulting quotient determines the diameter of the conductor to be employed in winding one of the coils of this winding section, e.g., segment SH3A. Enough additional coils (SH3B, SH3C, etc.) are then coaxially wound and connected in parallel with this coil to provide sufficient current carrying capacity. Accordingly, the winding structure of the present invention greatly reduces design problems and allows during design a critical adjustment of the winding height H. This allows fine control over the leakage inductance $L_L$ and distributed capacitance $C_D$ parameters simultaneously, so that if $L_L$ is increased $C_D$ decreases almost proportionately and vice versa. Therefore the product $L_L$ times $C_D$ may be held substantially constant while the impedance $$Z=\sqrt{\frac{L_L}{C_D}}$$

is set at a desired value. Or the product of $L_L$ times $C_D$ may be held substantially constant while the window dimensions of the core are optimized to result in a core of minimum weight.

Insulating problems are lessened, as there is in effect only one location (at the top of winding section SH3 in the embodiment illustrated in FIGS. 1 and 2) at which there exists a voltage which is relatively high with reference to the voltage across low voltage leads LV1 and LV2. Additionally, because there is no potential difference between adjacent high voltage winding layers SH3A, SH3B . . . when considered on any lateral plane, the provision of cooling ducts for the high voltage winding section is simplified. A cooling duct may be placed in the center of this section such that the only effect of this duct on the $L_L$ and $C_D$ parameters is in the increased mean length turn of the winding. The use of such a cooling duct enables all the windings to transfer heat to the cooling medium through a minimum of solid insulation, allowing reduction of conductor weight while keeping construction methods simple. The winding arrangement according to this invention also eliminates the problem of one high voltage conductor being more closely coupled than another.

FIG. 3 illustrates schematically a second embodiment of the present invention in which two sets of secondary windings, each with three winding sections, are provided for bifilar connection as opposed to the monofilar connection illustrated in FIGS. 1 and 2. An additional set of secondary winding section coils SH4 and SH5 is helically wound about primary winding section coils SL1 and SL2. The same size conductor and number of turns are used for each of the winding section coils SL1, SL2, SH1, SH2, SH4 and SH5. Each is the same height and wound coaxially on a transformer core leg. The three secondary winding sections SH1, SH2 and SH3 are serially connected as illustrated via terminal leads HV1 and HV2 across a pair of transformer terminals HVT1 and HVT2. The other set of secondary winding sections SH4, SH5 and SH6 is similarly serially connected via leads HV3 and HV4 as shown across a second set of transformer terminals HVT3 and HVT4. Secondary winding section SH6 is substantially identical to SH3 and is constituted by coils SH6A, SH6B and SH6C of conductor of the same size as used to form coils SH3A, SH3B, etc., and is therefore also of a smaller cross section than that used to form coils SL1, SL2, SH1 and SH2. Winding sections SH3 and SH6 are spaced apart to provide spacing therebetween to accommodate a cooling duct D.

As explained above, there is no potential difference between the bottom turns of coils SL1, SH1 and SL2, SH2, and (assuming the exemplary values noted above) only 5 kv. between the bottom turns of these coils and the bottom turn of coil SH3. Also the bottom turns of SH4 and SH5 are at the same potential as the bottom turns of SL1, SL2, SH1, SH2, and have the same potential relative to the bottom turns of the SH6 coils. Accordingly, the insulating requirements at the bottom of the winding structure are considerably less than those at the top. Therefore in FIG. 3, instead of employing an insulating layer having a substantially rectangular cross section, insulating layers 29' and 31' are employed, each having a wedge-shaped cross section. Each of these insulating layers varies in thickness from a maximum at the top of coil SH3 to a minimum at the bottom thereof. The weight and expense of the transformer winding are thus reduced in the FIG. 3 embodiment without adversely affecting its electrical characteristics.

Although the leads to the transformer terminals are all shown extending upwardly from the winding sections in the illustrations, it will be understood that some or all of these leads could extend downwardly by changing the routing of the interconnecting loops, and the winding direction of the coil turns, etc. Moreover, while the winding structure of the present invention has been illustrated as embodied in a shell type transformer, it is to be understood that it could be embodied in other types of transformers, for example, core type transformers.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. In a transformer having first and second pairs of terminals and a core of magnetic material with a winding leg, a winding structure comprising a primary winding including first and second sections, each section comprising a coil of electrical conductor of a first cross-sectional area progressively wound about said core leg unidirectionally from one end thereof, said coils being connected across said first pair of transformer terminals, and a secondary winding including first and second secondary winding sections each comprising a coil of electrical conductor having a cross-sectional area not greater than said first cross-sectional area and progressively wound about said core leg unidirectionally from one end thereof, each of said first and second secondary winding section coils being respectively positioned contiguous said primary winding section coils, each of said primary and secondary coils having an equal number of turns and being of substantially equal length along said leg whereby adjacent turns of the contiguous primary and secondary coils are at substantially the same potential, said secondary winding further including a third winding section comprising at least two coils of electrical conductor having a cross-sectional area not greater than said first cross-sectional area and progressively wound about said core leg unidirectionally from one end thereof, each of said third winding section coils being of a length along said leg substantially equal to that of said primary and other secondary winding coils, said third secondary winding section coils being parallel-connected one with the others and positioned side-by-side relative thereto, and means for connecting said three secondary winding sections in series across said second pair of terminals.

2. In a transformer as set forth in claim 1, said first and second secondary winding section coils being respectively positioned in a side-by-side relationship contiguous said primary winding section coils.

3. In a transformer as set forth in claim 1, the dimension of the conductor constituting said first and second secondary winding section coils in the direction parallel to the central axis of the coils being substantially equal to the corresponding dimension of the conductors constituting the first and second primary winding section coils.

4. In a transformer as set forth in claim 3, said electrical conductors constituting said first and second secondary winding section coils having a cross-sectional area substantially equal to said first cross-sectional area.

5. In a transformer as set forth in claim 1, said third winding section being positioned between said first and second secondary winding coils, said coils all being coaxially positioned one within another.

6. In a transformer as set forth in claim 1, said winding structure including at least one insulating layer separating said third secondary winding section from the other winding sections, said insulating layer varying in thickness from a maximum at one end of said third winding section to a minimum at the other end thereof.

7. In a transformer as set forth in claim 1, said first and second primary winding section coils being wound with a single length of electrical conductor, and being serially connected across said first pair of transformer terminals.

8. In a transformer as set forth in claim 7, said first and second secondary winding section coils being wound with a single length of electrical conductor.

9. In a transformer as set forth in claim 1, said third winding section having at least one coil spaced substantially away from an adjacent parallel-connected third winding coil, and at least one cooling duct disposed in the space thereby provided between the adjacent said third secondary winding coils.

10. In a transformer as set forth in claim 2, said winding sections being positioned coaxially about the core leg in the following order of increasing diameter: first secondary winding section, first primary winding section, third secondary winding section, second primary winding section and second secondary winding section.

11. In a transformer as set forth in claim 1 which further incudes a third pair of terminals, said winding structure including three additional winding sections substantially identical respectively to said first and second and third secondary winding sections and positioned in a side-by-side relationship contiguous respectively said first and second and third secondary winding sections, and means for connecting said additional winding sections in series across said third pair of terminals.

12. In a transformer having first and second pairs of terminals and a core of magnetic material with a winding leg, a winding structure comprising a primary winding including first and second sections, each section comprising a coil of electrical conductor of a first cross-sectional area progressively wound coaxially about said core leg unidirectionally from one end thereof, said coils being connected across said first pair of transformer terminals, and a secondary winding including first and second secondary winding sections each comprising a coil of electrical conductor having a cross-sectional area not greater than said first cross-sectional area and progressively wound coaxially about said core leg unidirectionally from one end thereof, each of said first and second secondary winding section coils being respectively positioned contiguous said primary winding section coils, each of said primary and secondary coils having an equal number of turns and being of substantially equal length along said leg whereby adjacent turns of the contiguous primary and secondary coils are at substantially the same potential, said secondary winding further including a third winding section comprising at least two coils of electrical conductor having a cross-sectional area less than said first cross-sectional area and progressively wound coaxially about said core leg unidirectionally from one end thereof, each of said third winding section coils being of a length along said leg substantially equal to that of said primary and other secondary winding coils and having a greater number of turns than each of said primary and other secondary winding section coils, said third secondary winding section coils being parallel-connected one with the others and positioned side-by-side relative thereto, and means for connecting said three secondary winding sections in series across said second pair of terminals.

13. In a transformer having first and second pairs of terminals and a core of magnetic material with a winding leg, a winding structure comprising a primary winding including first and second sections, each section comprising a coil of electrical conductor of a first cross-sectional area progressively wound coaxially about said core leg unidirectionally from one end thereof, said coils being serially connected across said first pair of transformer terminals, and a secondary winding including first and second secondary winding sections each comprising a coil of electrical conductor having a cross-sectional area substantially equal to said first cross-sectional area and progressively wound coaxially about said core leg unidirectionally from one end thereof, each of said first and second secondary winding section coils being respectively positioned in a side-by-side relationship contiguous said primary winding section coils, each of said primary and secondary coils having an equal number of turns and being of substantially equal length along said leg whereby adjacent turns of the contiguous primary and secondary coils are at substantially the same potential, each of said primary and secondary coils being coaxially positioned one within another, said secondary winding further including a third winding section comprising at least two coils of electrical conductor having a cross-sectional area less than said first cross-sectional area and progressively wound about said core leg unidirectionally from one end thereof, each of said third winding section coils being of a length along said leg substantially equal to that of said primary and other secondary winding coils and having a greater number of turns than each of said primary and other secondary winding section coils, said third secondary winding coils being parallel-connected one with the others and positioned side-by-side relative thereto, and means for connecting said three secondary winding sections in series across said second pair of terminals.

References Cited by the Examiner
UNITED STATES PATENTS

| | | | |
|---|---|---|---|
| 755,766 | 3/04 | Hall | 336—183 X |
| 1,304,184 | 5/19 | Johannesen | 336—183 |
| 2,680,218 | 6/54 | Keroes | 336—183 |
| 2,713,667 | 7/55 | Schwennesen | 336—183 |
| 2,993,183 | 7/61 | Moore et al. | 336—70 X |

LARAMIE E. ASKIN, *Primary Examiner.*

JOHN F. BURNS, *Examiner.*